United States Patent
Lee et al.

(10) Patent No.: US 7,167,302 B2
(45) Date of Patent: Jan. 23, 2007

(54) GAIN-FLATTENED WIDEBAND ERBIUM-DOPED OPTICAL FIBER AMPLIFIER

(75) Inventors: Jong-Hun Lee, Suwon-shi (KR); Se-Kang Park, Songnam-shi (KR); Hak-Phil Lee, InchonKwangyok-shi (KR); Ki-Cheol Lee, Suwon-shi (KR); Jong-Kwon Kim, Taejonkwangyok-shi (KR); Sang-Hyun Doh, Kyonggi-do (KR); Sang-Il Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/674,102

(22) Filed: Sep. 29, 2003

(65) Prior Publication Data

US 2004/0240045 A1 Dec. 2, 2004

(30) Foreign Application Priority Data

May 17, 2003 (KR) .................. 10-2003-0031402

(51) Int. Cl.
*H01S 3/00* (2006.01)
(52) U.S. Cl. .................. 359/349; 359/341.32
(58) Field of Classification Search .............. 359/349, 359/341.3, 341.32
See application file for complete search history.

(56) References Cited

U.S. PATENT DOCUMENTS 6,049,417 A * 4/2000 Srivastava et al. ....... 359/337.4
6,049,418 A * 4/2000 Srivastava et al. ....... 359/337.4

FOREIGN PATENT DOCUMENTS

JP    2001-057454    2/2001
JP    2001-203415    7/2001

* cited by examiner

*Primary Examiner*—Mark Hellner (57) ABSTRACT

A wideband erbium-doped optical fiber amplifier is disposed among an optical fiber through which a first and second band-band optical signals (for example, the C-band and L-band) are transmitted and forms a first optical path and a second optical path parallel to each other. The wideband erbium-doped optical fiber amplifier comprising a first amplifying section disposed on the first optical path, including a first erbium-doped optical fiber to amplify the first-band optical signals, a filter to gain-flatten the amplified first-band optical signals, wherein a reflected portion of the first band optical signal by the filter is directed to the second optical path; and a second amplifying section disposed on the second optical path, having a second erbium-doped optical fiber to amplify received second-band optical signals, wherein the reflected first-band optical signal is used to pump the second erbium-doped optical fiber.

14 Claims, 6 Drawing Sheets

GAIN-FLATTENED WIDEBAND ERBIUM-DOPED OPTICAL FIBER AMPLIFIER

CLAIM OF PRIORITY

This application claims priority to an application entitled "Gain-flattened wideband erbium-doped optical fiber amplifier," filed in the Korean Intellectual Property Office on May 17, 2003 and assigned Ser. No. 2003-31402, the contents of which are hereby incorporated by reference.

BACKGROUND OF THE INVENTION

1. Field of the Invention

The present invention relates to an optical fiber amplifier, and more particularly to a wideband erbium-doped optical fiber amplifier for amplifying C-band and L-band optical signals.

2. Description of the Related Art

An optical fiber amplifier is an apparatus used in an optical transmission system to amplify optical signals without optoelectric conversion. Accordingly, the optical fiber amplifier has a simple and economic construction. Such an optical fiber amplifier includes (1) a gain medium optical fiber, (2) a pumping light source necessary in optical pumping, (3) a wavelength division multiplexing (WDM) optical coupler for coupling an optical signal and pumping light to the gain medium optical fiber, and (4) an optical isolator for passing forward light and intercepting backward light.

The optical signal is amplified through an induced discharge of rare-earth elements, such as erbium, added to the gain medium optical fiber. Specifically, the pumping light excites the rare-earth element ions added to the gain medium optical fiber. Thereafter, the optical signal incident to the gain medium optical fiber is amplified through the induced discharge of the excited ions. In current ultrahigh speed WDM optical transmission systems, a wavelength band of 1.55 μm is widely used along with erbium-doped optical fiber amplifiers suitable for amplifying such a wavelength band. WDM optical technology is capable of simultaneously transmitting a plurality of channels with different wavelengths using a single-core optical fiber. WDM optical technology, researches are actively seeking wider transmission bands, for example by using optical signals not only the C-band, having a wavelength band of 1525 to 1565 nm, but also the L-band, having a wavelength band of 1570 to 1610 nm. In particular, researchers are seeking a wideband erbium-doped optical fiber amplifier (which is one of core elements of a WDM optical communication system) that can amplify not only C-band optical signals but also L-band optical signals.

A typical C-band erbium-doped optical fiber amplifier utilizes a population inversion of 70 to 100%. This produces non-uniform gain characteristics (according to wavelengths) for the C-band erbium-doped optical fiber amplifier. Usually, the C-band erbium-doped optical fiber amplifier has the highest gain at a wavelength of 1530 nm and has the lowest gain at a wavelength of 1560 nm. Various gain-flattening methods are used, since the C-band erbium-doped optical fiber amplifier has non-uniform gain characteristics. Conventional gain-flattening methods include a method employing an optical filter, a method employing a Fabry-Perot filter, a method employing a Mach-Zender interferometer, a method employing a dielectric thin film, and a method employing an optical Fiber Bragg Grating (FBG), etc. In such gain flattening methods, a filter designed to have a loss spectrum that is opposite to the gain spectrum of the C-band erbium-doped optical fiber amplifier is used, thereby obtaining a uniform gain regardless of wavelengths. Among the various gain flattening methods described above, the method employing an optical Fiber Bragg Grating is generally utilized.

An optical fiber grating is an optical fiber element having optical fiber cores each of which has a periodically changing refractivity. They either reflect or eliminate optical signals (channels) of specific wavelengths from multi-wavelength optical signals incidented to the optical fiber grating. Optical fiber gratings may be classified into long period (reflection type) and short period (elimination type) optical fiber gratings. In the short period optical fiber grating, optical fiber cores have a refractivity changing in a period of several hundreds nanometers (which is generally called "grating period"). Optical fiber mode coupling occurs between a forward mode and a backward mode, thereby reflecting only a channel of a specific wavelength from an incidented multi-wavelength optical signal. In contrast, in the long period optical fiber grating, a grating period is several hundreds micrometers. Optical fiber mode coupling occurs between two forward modes, thereby eliminating only a channel of a specific wavelength from an incidented multi-wavelength optical signal. A transmission (reflection) spectrum of an optical fiber grating can be properly adjusted according to the grating period, grating intensity, grating length, and refractivity distribution.

In one method of employing a long period optical fiber grating for flattening the gain of the C-band erbium-doped optical fiber amplifier, the long period optical fiber grating is first designed to have a transmission spectrum opposite to the gain spectrum of the C-band erbium-doped optical fiber amplifier. Then it is inserted into the C-band erbium-doped optical fiber amplifier, thereby enabling the gain to be uniform regardless of the wavelengths. This method does not require a separate additional optical element since there is no reflected optical signal. However, this method has a number of shortcomings including having a spectrum characteristic that is very sensitive to temperature. In order to overcome such temperature sensitivity, another method employing a chirped optical fiber grating (or Chirped Fiber Bragg Grating; CFBG) has been proposed. This method has a short period optical fiber gratings. The CFBG has a grating with a grating period that changes linearly or non-linearly in a longitudinal direction of the grating. In this method, the CFBG is designed with a reflection spectrum opposite to the gain spectrum of the C-band erbium-doped optical fiber amplifier. Then, it is inserted into the erbium-doped optical fiber amplifier, thereby enabling the gain to be uniform. However, this method requires an additional optical element such as an optical isolator in order to prevent an optical signal reflected by the CFBG from coupling and interfering with a forward optical.

When compared to a C-band erbium-doped optical fiber amplifier, an L-band erbium-doped optical fiber amplifier shows no difference in the pumping light source.

However, it is about five to ten times longer, since the L-band erbium-doped optical fiber amplifier utilizes population inversion of about 40%. Further, an article entitled "Flat gain erbium-doped fiber amplifier in 1570 nm–1600 nm region for dense WDM transmission systems", OFC '97, vol. PD3, 1997, by M. Fukushima, Y Tashiro, and H. Ogoshi, has shown that the gain flattening characteristic of an L-band erbium-doped optical fiber amplifier is improved through co-pumping by auxiliary pumping light source of the C-band (1530, 1550, or 1570 nm) wavelength together with an existing high power LD light source of 980 or 1480 nm However, such a method requires a separate exterior light source as an auxiliary pumping light source.

Figure 1:
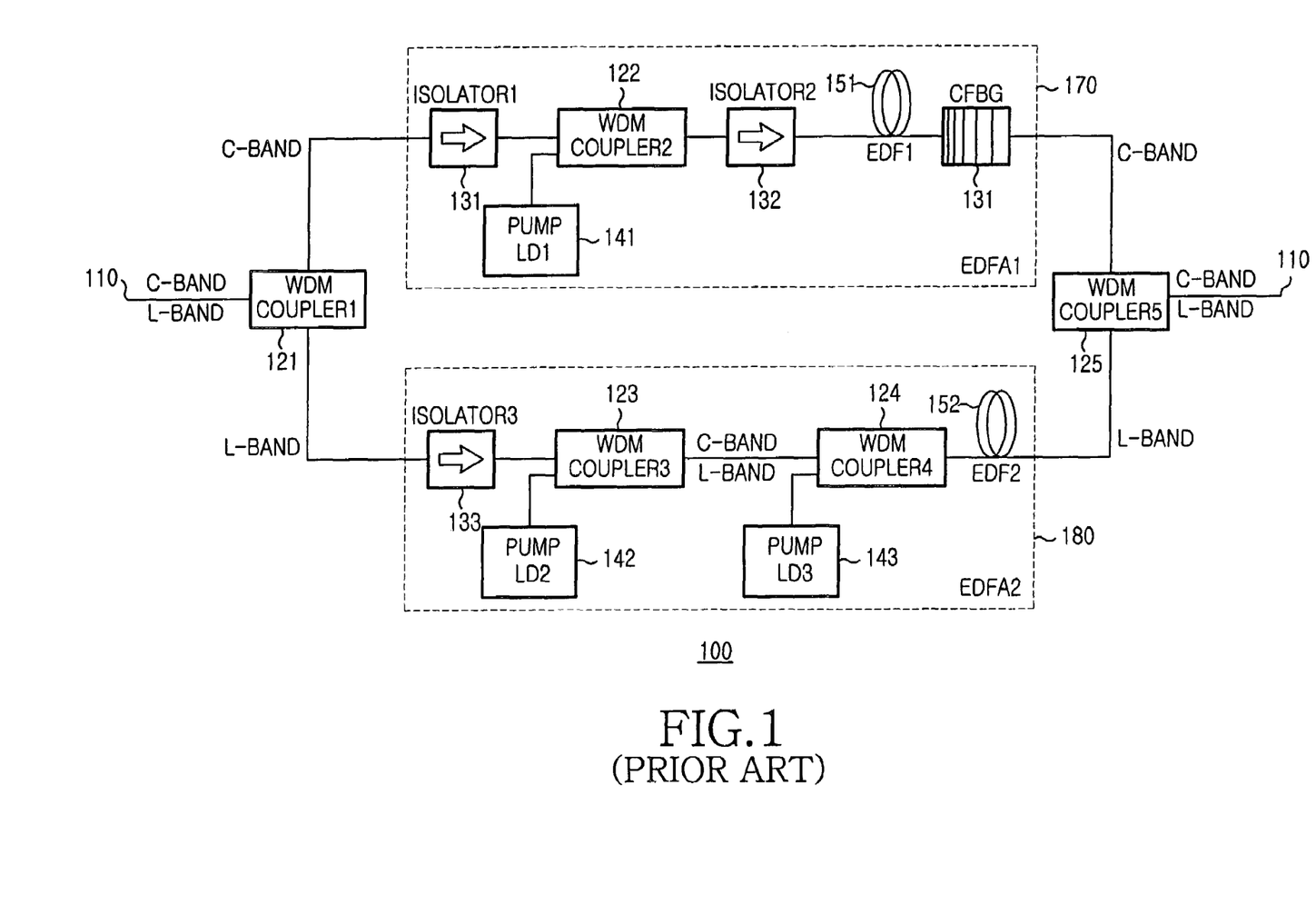
FIG. 1 illustrates a conventional wideband erbium-doped optical fiber amplifier.

FIG. 1 illustrates a conventional wide band erbium-doped optical fiber amplifier. The conventional erbium-doped optical fiber amplifier 100 is disposed on an external optical fiber 110 and includes a first and a second amplifying section 170 and 180 and a first and a fifth WDM coupler 121 and 125 for connecting the first and second amplifying section 170 and 180 in parallel to each other.

The first WDM coupler 121 divides an optical signal of 1550 and 1580 nm wavelength bands received through the external optical fiber 110 into optical signals of a 1550 nm wavelength band (C-band) and a 1580 nm wavelength band (L-band). Then it outputs the C-band optical signal to a first optical path and the L-band optical signal to a second optical path.

The first amplifying section 170 includes a first and a second isolator 131 and 132, a first pump LD 141, a second WDM coupler 122, a first erbium-doped optical fiber 151, and a chirped optical fiber grating 160. Each of the first isolator 131 and the second isolator 132 intercepts backward light such as Amplified Spontaneous Emission (ASE) noise outputted from the first erbium-doped optical fiber 151. The first pump LD 141 outputs a first pumping light having a wavelength of 980 nm or 1480 nm. The second WDM coupler 122 is interposed between the first isolator 131 and the second isolator 132. It couples the C-band optical signal having passed the first isolator 131 with the first pumping light inputted from the first pump LD 141. Then, it outputs the coupled light. The first erbium-doped optical fiber 151 experiences a population inversion (is pumped) by the first pumping light that has passed the second isolator 132. It also amplifies the C-band optical signal that has passed the second isolator 132. The chirped optical fiber grating 160 gain-flattens the C-band optical signal received from the first erbium-doped optical fiber 151.

The second amplifying section 180 includes a third isolator 133, a second and a third pump LD 142 and 143, a third and a fourth WDM coupler 123 and 124, and a second erbium-doped optical fiber 152. The second pump LD 142 intercepts backward light such as ASE noise outputted from the second erbium-doped optical fiber 152. The second pump LD 142 outputs a second pumping light having a wavelength of 980 nm or 1480 nm. The third WDM coupler 123 couples the L-band optical signal that has passed the third isolator 133 with the second pumping light received from the second pump LD 142. Then it outputs the coupled light. The third pump LD 143 outputs a third pumping light having a wavelength of 1550, 1530 or 1570 nm. The fourth WDM coupler 124 couples the L-band optical signal inputted from the third WDM coupler 123 with the second and third pumping lights. Then it outputs the coupled light. The second erbium-doped optical fiber 152 experiences a population inversion by the second and third pumping lights received from the fourth WDM coupler 124. It also amplifies the L-band optical signal received from the fourth WDM coupler 124.

The fifth WDM coupler 125 couples the C-band and L-band optical signals received through the first and second optical paths. Then it outputs them through the external optical fiber 110.

The first erbium-doped optical fiber 151 and the second erbium-doped optical fiber 152 have similar construction. The second erbium-doped optical fiber 152 has a length larger than that of the first erbium-doped optical fiber 151. Further, each of the first and second erbium-doped optical fibers 151 and 152 has a forward pumping construction in which the received optical signal and the pumping light progress in the same direction. However, each of them may have a backward pumping construction in which the inputted optical signal and the pumping light progress in opposite directions, if necessary.

As described above, the conventional wideband erbium-doped optical fiber amplifier 100 has gain flattening characteristics of not only the C-band but also the L-band optical signal. However, the conventional wideband erbium-doped optical fiber amplifier 100 has a number of limitations, including (1) that the first amplifying section 170 must include the second isolator 132 which is an additional element for preventing generation of backward ASE noise and (2) the second amplifying section 180 requires the second pump LD 142 as a separate and auxiliary pumping light source.

SUMMARY OF THE INVENTION

Accordingly, the present invention has been made to reduce or overcome the above-mentioned problems occurring in the prior art. One object of the present invention is to provide a gain-flattened wideband erbium-doped optical fiber amplifier which does not require a separate pumping light source. Consequently, enabling a simpler and lower-cost optical fiber amplifier.

In accordance with the principles of the present invention, a wideband erbium-doped optical fiber amplifier is disposed among an optical fiber through which a first and second wavelength-band optical signals (for example, the C-band and L-band) are transmitted and forms a first optical path and a second optical path parallel to each other is provided, the amplifier including a first amplifying section disposed on the first optical path, including a first erbium-doped optical fiber to amplify the first-band optical signals, a filter to gain-flatten the amplified first-band optical signals, wherein a reflected portion of the first band optical signal by the filter is directed to the second optical path; and a second amplifying section disposed on the second optical path, having a second erbium-doped optical fiber to amplify received second-band optical signals, wherein the reflected first-band optical signal is used to pump the second erbium-doped optical fiber.

BRIEF DESCRIPTION OF THE DRAWINGS

The present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. For the purposes of clarity and simplicity, well-known functions or constructions are not described in detail as they would obscure the invention in unnecessary detail.

Figure 2:
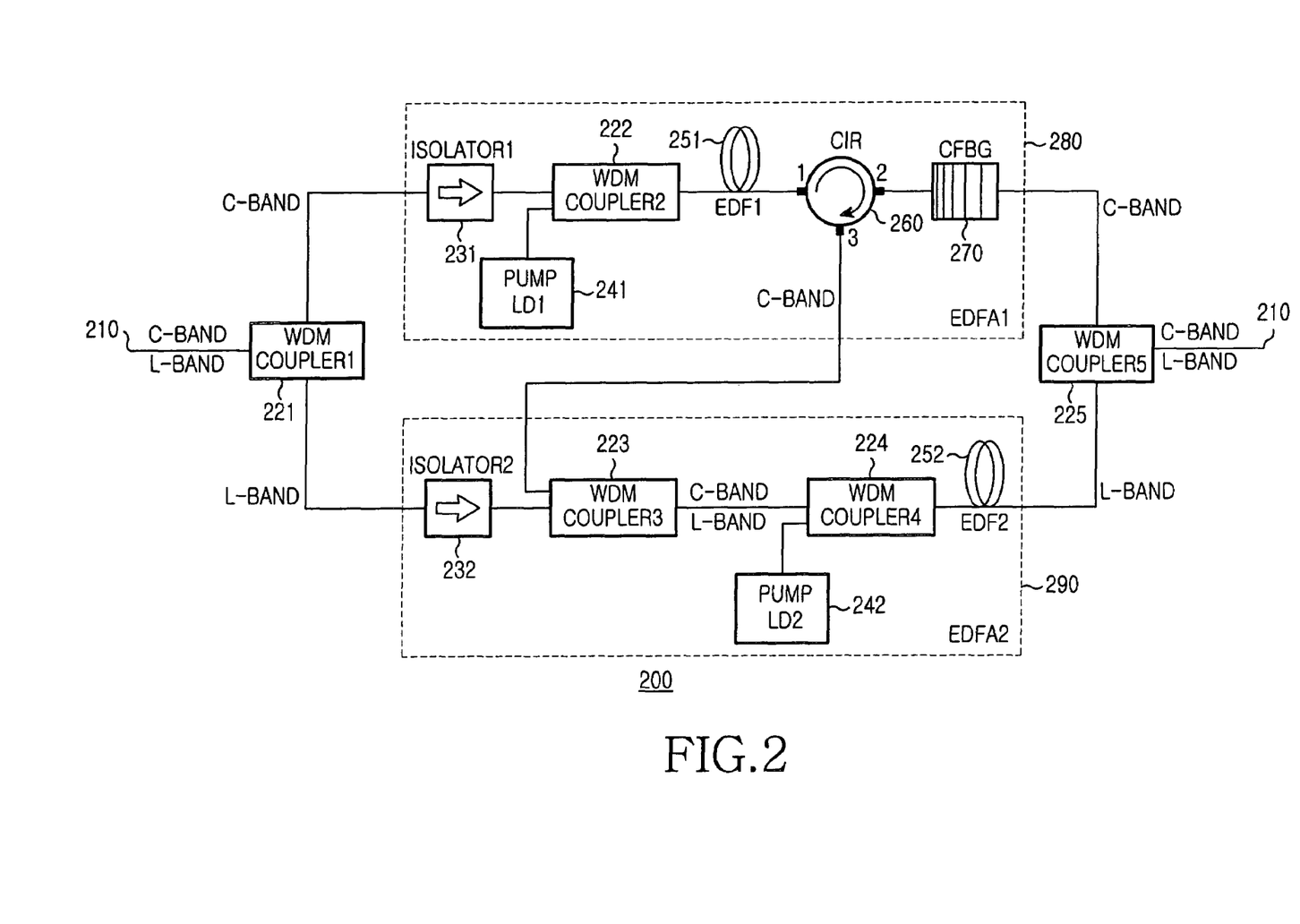
FIG. 2 illustrates a gain-flattened wideband erbium-doped optical fiber amplifier according to a first embodiment of the present invention.

FIG. 2 illustrates a gain-flattened wideband erbium-doped optical fiber amplifier according to a first embodiment of the present invention. The wideband erbium-doped optical fiber amplifier 200 is disposed on an external optical fiber 210. It includes a first and a second amplifying section 280 and 290, and a first and a fifth WDM coupler 221 and 225 for connecting the first and the second amplifying section 280 and 290 in parallel to each other.

The first WDM coupler 221 divides an optical signal of 1550 and 1580 nm wavelength bands received through the external optical fiber 210 into optical signals of a first wavelength band (for example 1550 nm, the C-band) and a second wavelength band (for example 1580 nm, the L-band). It then outputs the first or C-band optical signal to a first optical path and the second or L-band optical signal to a second optical path.

The first amplifying section 280 includes a first isolator 231, a first pump LD 241, a second WDM coupler 222, a first erbium-doped optical fiber 251, a circulator 260, and a filter 270.

The first isolator 231 intercepts backward light such as ASE noise outputted from the first erbium-doped optical fiber 251.

The first pump LD 241 outputs a first pumping light having a wavelength of 980 nm or 1480 nm. A laser diode (LD) or a light emitting diode (LED) may be employed as the first pump LD 241.

The second WDM coupler 222 couples the C-band optical signal that has passed the first isolator 231 with the first pumping light received from the first pump LD 241. It then outputs the coupled light.

The first erbium-doped optical fiber 251 experiences a population inversion (is pumped) by the first pumping light received from the second WDM coupler 222. It also amplifies the C-band optical signal received from the second WDM coupler 222.

The circulator 260 has three ports, a first port through a third port. The circulator 260 receives light through an upper port and outputs the received light through adjacent lower ports. Specifically, the first port of the circulator 260 is connected with the first erbium-doped optical fiber 251. The second port of the circulator 260 is connected with the filter 270. The third port of the circulator 260 is connected with the second amplifying section 290. In the circulator 260, the C-band optical signal received through the first port is outputted through the second port. The filtered C-band optical signal received through the second port is outputted through the third port.

The filter 270 is designed to have a transmission spectrum characteristic opposite to the gain spectrum characteristic of the first erbium-doped optical fiber 251. In the gain spectrum, a non-uniform portion (i.e. the filtered C-band optical signal) is reflected by the filter 270. The reflected C-band optical signal is inputted to the second port of the circulator 260 as a second pumping light.

The second amplifying section 290 includes a second isolator 232, a second pump LD 242, a third and a fourth WDM coupler 223 and 224, and a second erbium-doped optical fiber 252.

The second isolator 232 intercepts backward light such as ASE noise outputted from the second erbium-doped optical fiber 252.

The third WDM coupler 223 couples the L-band optical signal that has passed the second isolator 232 with the second pumping light received from the circulator 260. It then outputs the coupled light.

The second pump LD 242 outputs a third pumping light having a wavelength of 1550, 1530 or 1570 nm. An LD or LED may be employed as the second pump LD 242.

The fourth WDM coupler 224 couples the L-band optical signal received from the third WDM coupler 223 with the second and third pumping lights. It then outputs the coupled light. The second erbium-doped optical fiber 252 experiences a population inversion (is pumped) by the second and third pumping lights received from the fourth WDM coupler 224. It also amplifies the L-band optical signal received from the fourth WDM coupler 224.

The fifth WDM coupler 225 couples the C-band and L-band optical signals received from the first and second optical paths with each other. It then outputs them through the external optical fiber 210.

Although each of the first and second erbium-doped optical fibers 251 and 252 has a forward pumping construction in the present embodiment, they may have either a forward pumping construction or a backward pumping construction. In the erbium-doped optical fiber amplifier 200, the gain of the first amplifying section 280 is first flattened using the filter 270. Thereafter, the C-band optical signal reflected by the filter is supplied to the second erbium-doped optical fiber 252 as an auxiliary second pumping light. Consequently, the erbium-doped optical fiber amplifier 200 of the present invention has a simpler construction, as well as enabling a competitive price.

Figure 3:
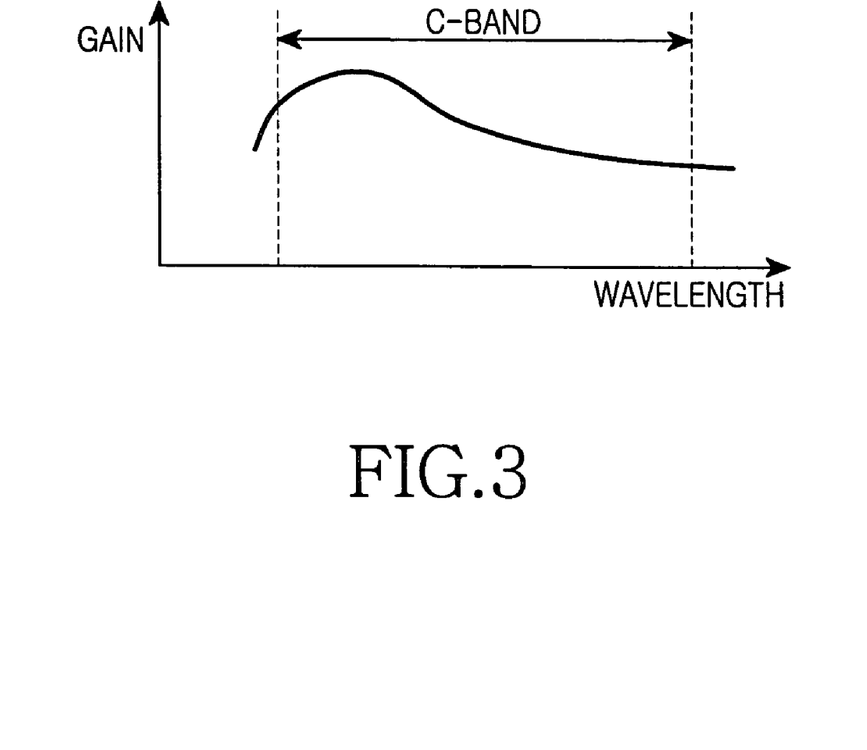
FIGS. 3 to 7 are graphs for describing the output characteristics of the erbium-doped optical fiber amplifier shown in FIG. 2.
Figure 4:
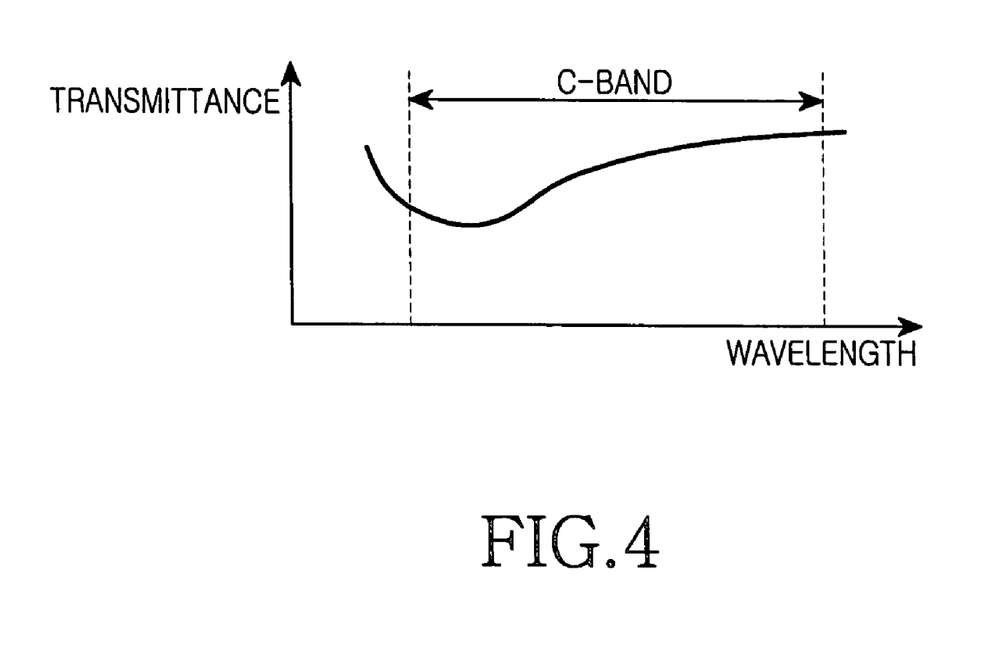
Figure 5:
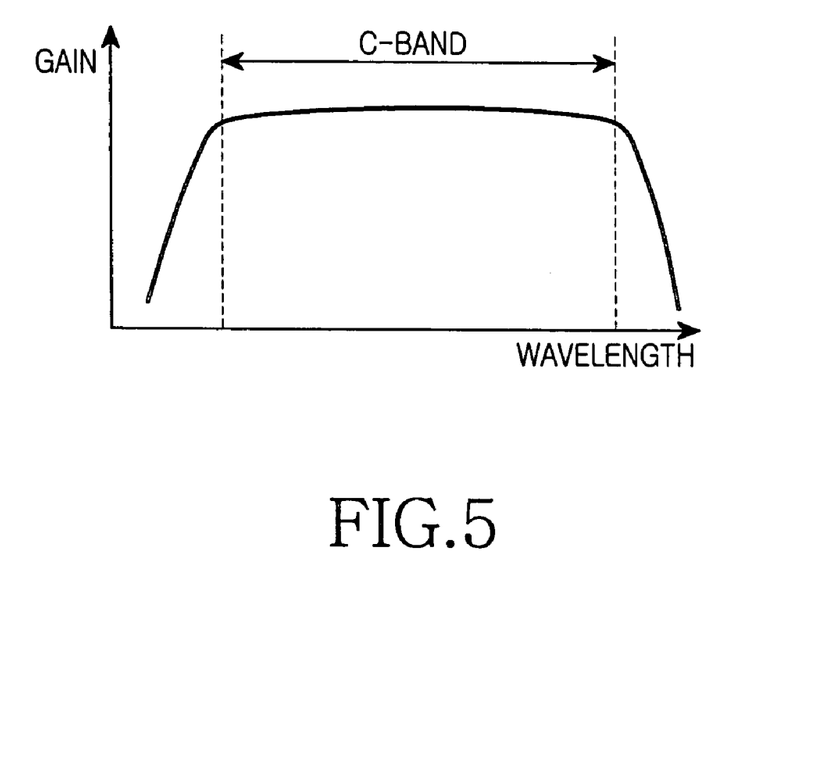
Figure 6:
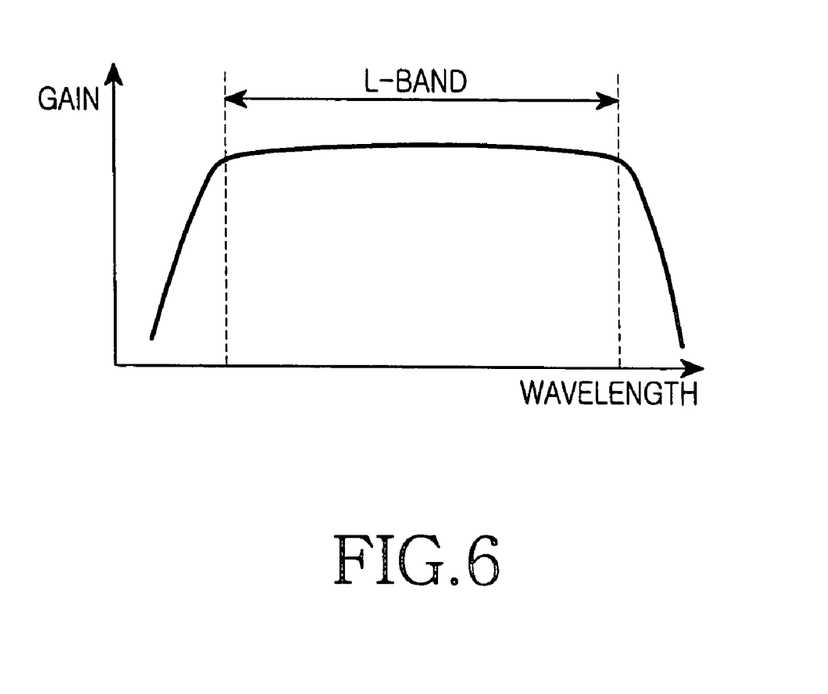
Figure 7:
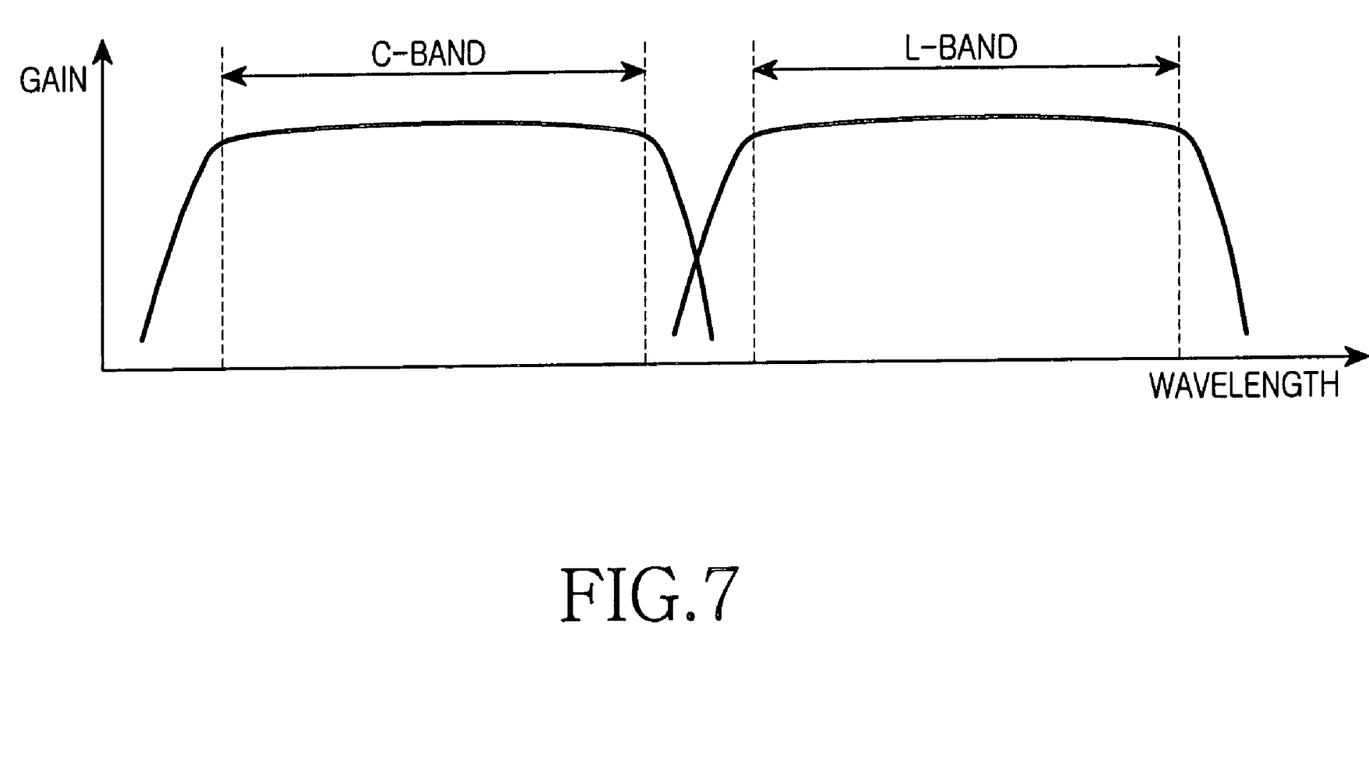

FIGS. 3 to 7 are graphs for describing output characteristics of the erbium-doped optical fiber amplifier 200 shown in FIG. 2. FIG. 3 shows a gain spectrum of the first erbium-doped optical fiber 251 which has a maximum gain value in a short wavelength region of the spectrum. FIG. 4 shows a transmission spectrum of the filter 270 which has a minimum gain value in a short wavelength region of the spectrum. FIG. 5 shows a gain spectrum of the first amplifying section 280 that is gain-flattened by the filter 270. FIG. 6 shows a gain spectrum of the second amplifying section 290 that is gain-flattened by employing the C-band optical signal reflected by the filter 270 as the auxiliary second pumping light. FIG. 7 shows a gain spectrum of the erbium-doped optical fiber amplifier 200 in which both the C-band optical signal and the L-band optical signal are gain-flattened by the filter 270.

Figure 8:
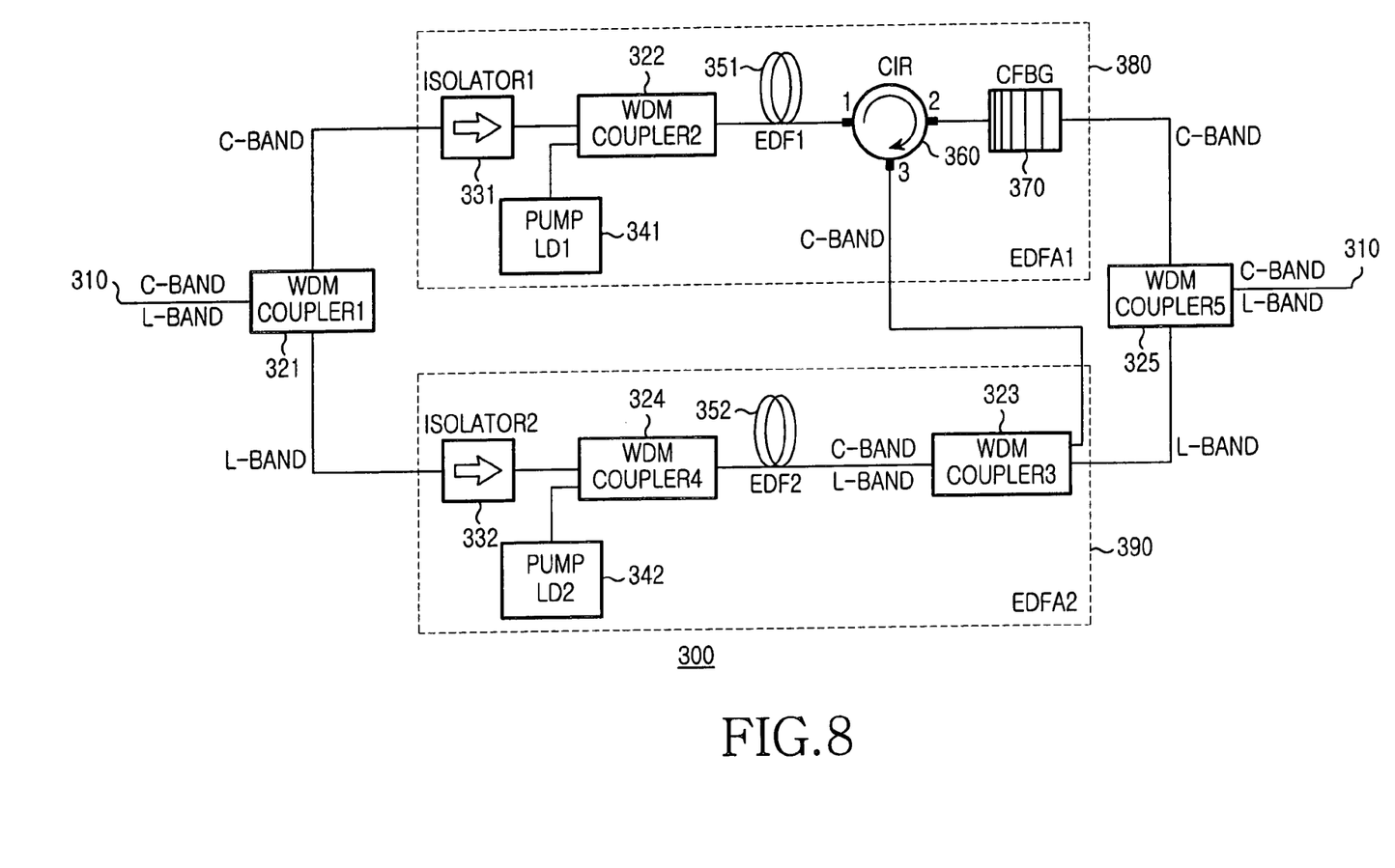
FIG. 8 illustrates a gain-flattened wideband erbium-doped optical fiber amplifier according to a second embodiment of the present invention.

FIG. 8 illustrates a gain-flattened wideband erbium-doped optical fiber amplifier according to a second embodiment of the present invention. The wideband erbium-doped optical fiber amplifier 300 is disposed on an external optical fiber 310. It includes a first and a second amplifying section 380 and 390 and a first and a fifth WDM coupler 321 and 325 for connecting the first and the second amplifying section 380 and 390 in parallel to each other. The erbium-doped optical fiber amplifier 300 has a construction similar to that of the erbium-doped optical fiber amplifier 200 shown in FIG. 2, except for the pumping structure of the second amplifying section 390.

The first WDM coupler 321 divides an optical signal of 1550 and 1580 nm wavelength bands received from the external optical fiber 310 into optical signals of a 1550 nm wavelength band (C-band) and a 1580 nm wavelength band (L-band). Then it outputs the C-band optical signal to a first optical path and the L-band optical signal to a second optical path.

The first amplifying section 380 includes a first isolator 331, a first pump LD 341, a second WDM coupler 322, a first erbium-doped optical fiber 351, a circulator 360, and a filter 370.

The first isolator 331 intercepts backward light such as ASE noise outputted from the first erbium-doped optical fiber 351.

The first pump LD 341 outputs a first pumping light having a wavelength of 980 nm or 1480 nm. An LD or LED may be employed as the first pump LD 341. The second WDM coupler 322 couples the C-band optical signal that has passed the first isolator 331 with the first pumping light received from the first pump LD 341. It then outputs the coupled light.

The first erbium-doped optical fiber 351 experiences a population inversion by the first pumping light received from the second WDM coupler 322. It also amplifies the C-band optical signal received from the second WDM coupler 322.

The circulator 360 has three ports, a first port through a third port. The circulator 360 receives light through an upper port and outputs the received light through adjacent lower ports. Specifically, the first port of the circulator 360 is connected with the first erbium-doped optical fiber 351. The second port of the circulator 360 is connected with the filter 370. The third port of the circulator 360 is connected with the second amplifying section 390. In the circulator 360, the C-band optical signal received from the first port is outputted through the second port. The filtered C-band optical signal received from the second port is outputted through the third port.

The filter 370 is designed to have a transmission spectrum characteristic opposite to the gain spectrum characteristic of the first erbium-doped optical fiber 351. In the gain spectrum, a non-uniform portion (i.e. the filtered C-band optical signal) is reflected by the filter 370. The reflected C-band optical signal is inputted to the second port of the circulator 360 as a second pumping light.

The second amplifying section 390 includes a second isolator 332, a second pump LD 342, a third and a fourth WDM coupler 323 and 324, and a second erbium-doped optical fiber 352.

The second isolator 332 intercepts backward light such as ASE noise outputted from the second erbium-doped optical fiber 352.

The second pump LD 342 outputs a third pumping light having a wavelength of 1550, 1530 or 1570 nm. An LD or LED may be employed as the second pump LD 342.

The fourth WDM coupler 324 couples the L-band optical signal that has passed the second isolator 332 with the third pumping light. It then outputs the coupled light.

The third WDM coupler 323 outputs the second pumping light received from the circulator 360 to the second erbium-doped optical fiber 352. It also allows the L-band optical signal received from the second erbium-doped optical fiber 352 to pass intact through the third WDM coupler 323.

The second erbium-doped optical fiber 352 experiences a population inversion by the third pumping light received from the fourth WDM coupler 324 and the second pumping light received from the third WDM coupler 323. It also amplifies the L-band optical signal received from the fourth WDM coupler 324. In this manner, the second erbium-doped optical fiber 352 is pumped forward by the third pumping light and backward by second pumping light.

The fifth WDM coupler 325 couples the C-band and L-band optical signals received from the first and second optical paths. It then outputs them through the external optical fiber 310.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wideband erbium-doped optical fiber amplifier, for use with a first and second wavelength band optical signals, having a first optical path and a second optical path parallel to each other, comprising:
   a first amplifying section disposed on the first optical path, the first amplifying section including a first erbium-doped optical fiber configured to amplify the first-band optical signals and a filter configured to gain-flatten the amplified first-band optical signals and to reflect a portion of the first band optical signal to the second optical path; and
   a second amplifying section disposed on the second optical path the second amplifying section having a second erbium-doped optical fiber and configured to amplify received second-band optical signals,
   wherein the reflected first-band optical signal pumps the second erbium-doped optical fiber.

2. The wideband erbium-doped optical fiber amplifier as claimed in claim 1, wherein the wideband erbium-doped optical fiber amplifier is disposed on an optical fiber through which first and second wavelength band optical signals are transmitted.

3. The wideband erbium-doped optical fiber amplifier as claimed in claim 1, wherein the first and second wavelength band optical signals are a C-band and a L-band optical signal.

4. The wideband erbium-doped optical fiber amplifier as claimed in claim 3, further including a circulator disposed between the second optical path and the filter, the circulator configured to output the amplified C-band optical signal to the filter and the reflected portion of the first band optical signal by the filter to the second optical path.

5. The wideband erbium-doped optical fiber amplifier as claimed in claim 1, wherein the portion of the first band optical signal reflected by the filter is a non-uniform portion in the gain spectrum.

6. The wideband erbium-doped optical fiber amplifier as claimed in claim 4, further comprising a first wavelength division multiplexing optical coupler configured to divide the received C-band and L-band optical signals and to provide the C-band optical signal to the first optical path and the L-band optical signal to the second optical path.

7. The wideband erbium-doped optical fiber amplifier as claimed in claim 6, further comprising a second wavelength division multiplexing optical coupler configured to couple the C-band and L-band optical signals from the first and second optical paths.

8. A wideband erbium-doped optical fiber amplifier as claimed in claim 4, wherein the first amplifying section further comprises:
   a first pumping light source configured to output a first pumping light for use by the first erbium-doped optical fiber; and
   a second wavelength division multiplexing optical coupler configured to -provide the first pumping light to the first erbium-doped optical fiber.

9. A wideband erbium-doped optical fiber amplifier as claimed in claim 8, wherein the first amplifying section further comprises a first isolator disposed on the first optical path, the first isolator configured to intercept an Amplified Spontaneous Emission output from the first erbium-doped optical fiber.

10. A wideband erbium-doped optical fiber amplifier as claimed in claim 1, wherein the second amplifying section further comprises:
   a second pumping light source configured to provide a second pumping light for use by the second erbium-doped optical fiber; and
   a fourth wavelength division multiplexing optical coupler configured to provide the second pumping light to the second erbium-doped optical fiber.

11. A wideband erbium-doped optical fiber amplifier as claimed in claim 10, wherein the second amplifying section further comprises a second isolator disposed on the second optical path, the second isolator configured to intercept an Amplified Spontaneous Emission output from the second erbium-doped optical fiber.

12. A wideband erbium-doped optical fiber amplifier as claimed in claim 4, wherein the filter comprises a chirped optical fiber grating.

13. A wideband erbium-doped optical fiber amplifier as claimed in claim 4, wherein the second erbium-doped optical fiber is pumped forward by the reflected C-band optical signal.

14. A wideband erbium-doped optical fiber amplifier as claimed in claim 1, wherein the second erbium-doped optical fiber is pumped backward by the reflected C-band optical signal.

* * * * *